United States Patent Office.

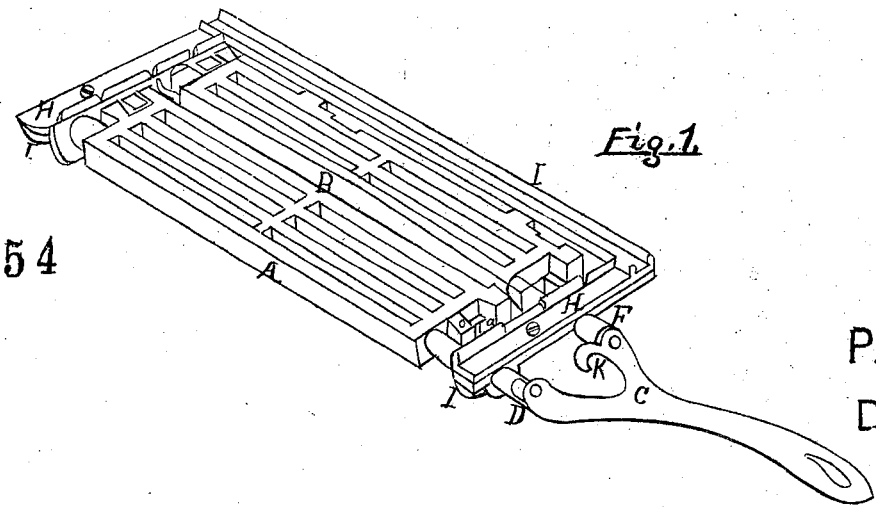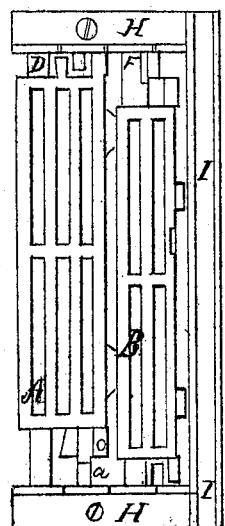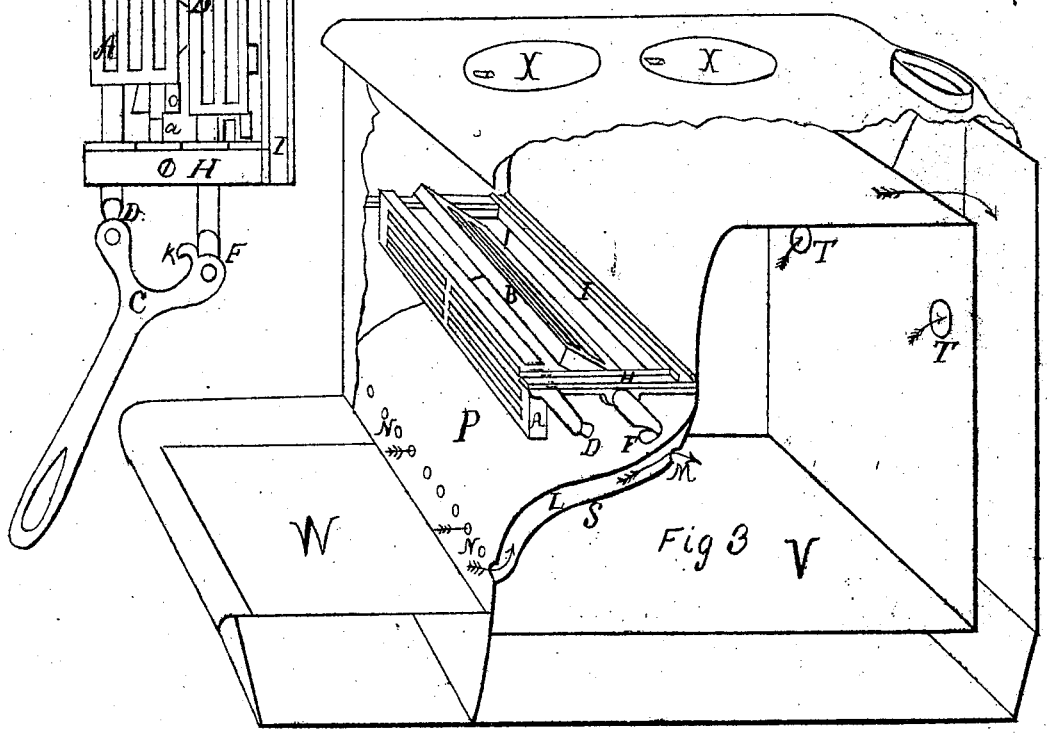

DANIEL E. PARIS, OF TROY, NEW YORK.

Letters Patent No. 72,754, dated December 31, 1867.

IMPROVEMENT IN STOVE-GRATES.

*The Schedule referred to in these Letters Patent and making part of the same.*

TO ALL WHOM IT MAY CONCERN:

Be it known that I, DANIEL E. PARIS, of Troy, in the county of Rensselaer, and State of New York, have invented new and useful Improvements in Grates for Stoves; and I do hereby declare that the following is a full, clear, and exact description thereof, which will enable others skilled in the art to make and use the same, reference being had to the accompanying drawings, forming a part of this specification, in which—

Figure 1 is a perspective view of the grate as it lies in the bed-plate I, and held together by the pieces H H.

Figure 2 is a top view of the grate or grates as they lie side by side, with one pulled out and the other shoved in, by the movement of the handle C operating on the journals D and F.

Figure 3 shows the grate in the stove, and its appearance after the coal and ashes are dumped out of it, and the hot-air chamber L, formed underneath the grate by the plates P and S.

This invention consists of and has for its object an improved method of clearing the ashes from the coal in the fire-box quickly and without dust in the room; and, second, to furnish a strong, durable grate, that is not liable to sink down and get out of order.

The hot-air chamber L, under the grate, is designed for the double purpose of ventilating the oven V by currents of hot air, entering at N N, passing through the chamber L, and coming out at M, and then passing through the oven V, and then into the rear flues of the stove at T T, thus furnishing the oven with a steady current of hot air, heated doubly by the chamber or ash-way below the grate, and further heated as it passes, through the chamber L to the oven.

The second object of the double plates P and S and the air-space L, is to prevent the front part of the oven V from getting too hot. When there is but one plate, as has heretofore been the case, the front part of the oven gets very hot, and especially if the grate is kept clear of ashes, which, with ordinary grates, it is difficult to do, and therefore it is not so necessary in an ordinary stove as in this stove, for with this grate there is no difficulty of keeping the fire-box perfectly clear of ashes. Thus, when so kept clear, the powerful radiation downward on to the plate P acts with such intensity that the plate must be double in order to protect the front part of the oven; and, by so making it, I gain the further advantage of a complete ventilation to the oven, in the manner described above. By this ventilation, the smoke from crusts or burnt pieces of bread or other food is carried at once off into the flues, as also are the noxious or offensive gases arising from baking bread or other food.

The grate is easily kept clean of ashes, so as to give a free fire, by the movement or vibration of the handle C, as in fig. 2. The journals D and F project through the side plates of the stove, so that the shaker C can be attached from the outside of the stove. This is a valuable feature of this invention, for the grate can be shaken, and also dumped, from the outside of the stove.

The grate is shaken by vibrating the handle backwards and forwards horizontally, and dumped of its contents by putting the right-hand prong of the shaker C on the journal F, and lifting it upward. This lets the grate A fall down perpendicularly, emptying its contents into the ash-way or ash-pan below. The coal lying on the grate B is thus raised up and pitched over forward into the space made vacant by the dumping of the grate A, which always falls first, making a space and room for the contents of the back grate B. After this dumping process, the grates lie in the position shown in fig. 3. To get them back again into position, all that is necessary is to change the shaker C, and put the left-hand prong on the pin of the journal D at about a right-angled position, that is, with the shaker-handle C projecting to the front. Then bear down the handle C quickly, giving the grate B a little knock as it lies, as seen in fig. 3, and you have both grates in position again. Both actions are very simple. The grate is easily and simply dumped of its contents, and equally easily brought up into position again, in the manner described; and what is more, and more particularly, this is all done from the outside of the stove, for the bed-plate I I goes clear across the stove, from side to side, and the journals D and F project through the side plate of the stove.

The utility of this grate consists in its durability, its cleanliness, its easy management. It is thought to be the most durable grate ever invented, from the fact that it has four journals instead of two, as heretofore; and, furthermore, the back grate B lies on the bed-plate I I, and the bed-plate rests on the stove ash-plate P, all around its back and both ends. Thus the back part of the grate B cannot possibly sink down, and the front part is directly opposite the two journals F F; and, as the grate is so narrow, and as one side cannot sink down, and as the other has these two journals to support it, hardly any amount of heat would cause it to sink; and, as the back part of the front grate lies on it, and is supported by it, it follows that, if the back grate does not sink, the front grate will not sink either; and then, too, the front part of the grate A is further supported by the two journals D D. This makes the grate exceedingly strong and durable. Its cleanliness and easy management are self-apparent, especially from the description given above.

In order that the grate perform as above described, it is necessary simply that the journals on one or both grates be hung or attached eccentrically. The journals may be at or near the front or back part of the grates, as desired. Single grates may have been hung eccentrically heretofore, but not when made double, and placed side by side, and independent journals placed at or near one side of one or both grates.

Having thus described my invention, what I claim, is—

1. Two grates, lying side by side, having each two outwardly-projecting journals, eccentrically attached, on either end, at or near their front or back sides, and one or both vibrated horizontally, by means of a pronged or double shaker.

2. I claim an eccentrically-journalled grate, with its rear side lying on the front part of a like grate, and so constructed for dumping that, as the rear part of the back grate turns upward, the rear part of the front grate falls downward.

DAN'L E. PARIS.

Witnesses:
    LEWIS POTTER,
    CHAS. E. POTTER.